Jan. 29, 1963    C. POTTER    3,075,609
NOISE SUPPRESSOR
Filed Sept. 10, 1958
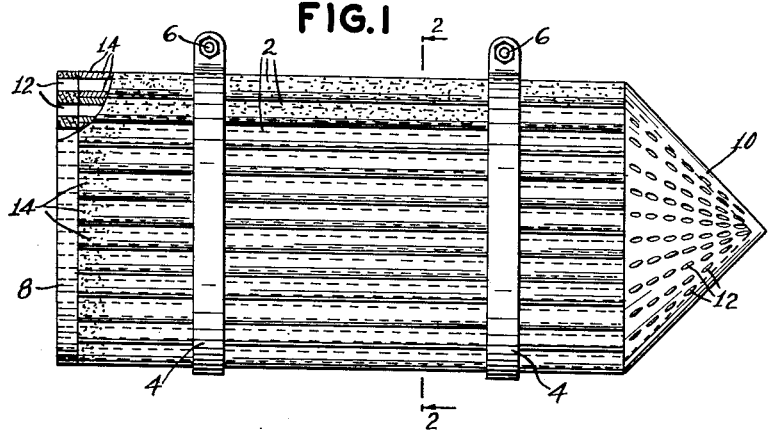
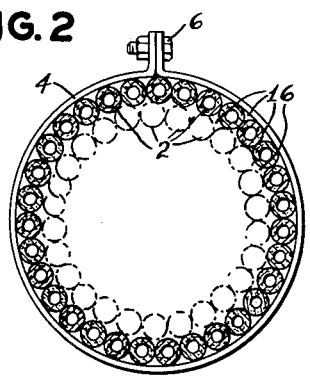
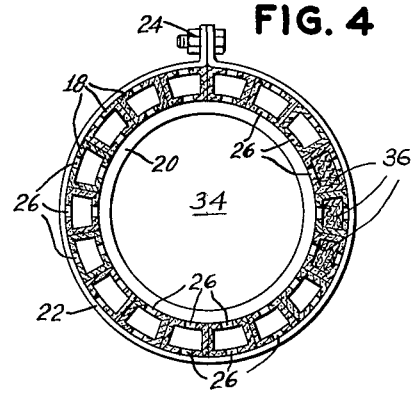
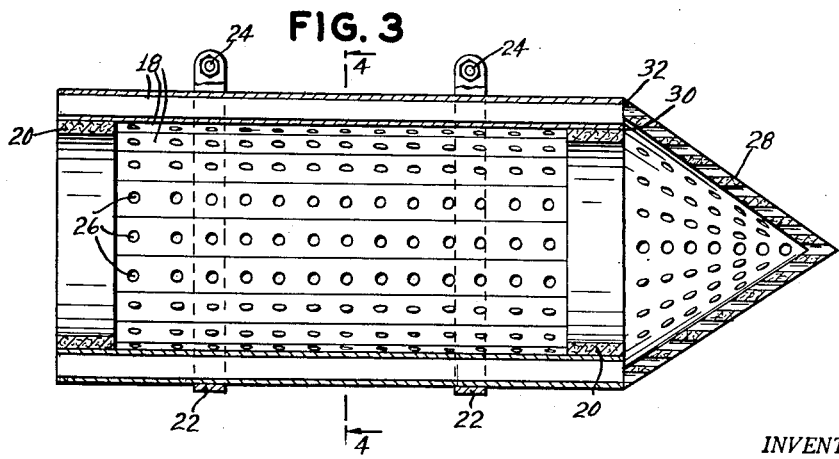
INVENTOR.
CHARLES POTTER
BY Karl Huber
James E. Bryan
ATTORNEYS United States Patent Office 3,075,609
Patented Jan. 29, 1963

3,075,609
NOISE SUPPRESSOR
Charles Potter, South Orange, N.J., assignor, by mesne assignments, to Engelhard Industries, Inc., Newark, N.J., a corporation of Delaware
Filed Sept. 10, 1958, Ser. No. 760,159
2 Claims. (Cl. 181—44)

The present invention is concerned with the problem of diminishing the intense noises produced by jet engines such as the engines in aircraft or the like.

The noises of such engines are much more disturbing than those originating from a gasoline or diesel engine and furthermore, the exhaust gases have a higher temperature; hence noise suppressors used in gasoline engines and made from steel, are not subjected to such a degree of thermal stress as are those used with jet engines.

In accordance with the invention, the noise suppressor comprises a plurality of fused silica tubes mounted substantially parallel to each other, usually adjacent to each other and united into a bundle by any suitable means, for example fusing, straps or the application of a heat resistant cement.

In the accompanying drawing, two embodiments of the invention are illustrated, wherein FIGURE 1 is a side view of one embodiment of a noise suppressor, FIGURE 2 is a cross section along the line 2—2 of FIGURE 1, FIGURE 3 is a longitudinal section through another modification of the noise suppressor, and FIGURE 4 is a cross section along the line 4—4 of FIGURE 3.

Referring to FIGURES 1 and 2, a plurality of fused silica tubes 2 of any suitable, preferably circular, cross section are held together by the steel straps 4, tightened by means of the bolts and nuts 6. At the outlet end, the more centrally located tubes may be longer than the tubes closer to the periphery, the end of each tube being beveled such that a conical end of the bundle is obtained. Thus, a bundle of parallel silica tubes, adjacent to each other is provided which, when mounted in the exhaust pipe of a jet engine, reduces the noises thereof considerably and is able to resist the extremely high temperatures better than any other material used heretofore.

Usually, fused silica tubes of about 0.5–10 inches outer diameter are used to form a bundle of about 0.5–10 feet in length. The diameter of the finished bundle may be about 12 to 18 inches. Good results are obtained with tubes of 4 inches outer diameter united to bundles of 6 feet in length.

In order to make the noise suppressor more resistant to mechanical shock, the endplates 8 and 10, made from fused silica, may be fused, cemented or affixed in any other way to the front and rear of the bundle, respectively. The endplate at the inlet side is a flat plate 8, whereas the plate 10 of conical shape conforms to the shape of the bundle at the outer end. In the plates 8 and 10, openings 12 are provided corresponding to the position of each tubing 2, thus leaving a free passage for the exhaust gases.

Another means to improve the sound damping action of the noise suppressor consists in providing a multitude of fine bores 14 through the wall of each tube 2, which bores connect the tubes with each other or with the tube-like longitudinal interstices 16 between the tubes as shown in FIGURE 1. In order to increase the sound damping action, the bores 14 may form an oblique angle with the axes of the tubes 2.

The modification of the noise suppressor illustrated in FIGURES 3 and 4 consists essentially of one row of tubes 18 mounted along the circumferences of the supporting rings 20 made of fused silica, maintained by the steel straps 22 and tightened by means of the bolts and nuts 24. The tubes 18 have a trapezoidal cross section. As a result of this arrangement, the tubes form a cylinder and an inner space 34 is left free for the main stream of exhaust gases.

Similarly to the modification shown in FIGURES 1 and 2, a multitude of fine oblique bores 26 may be provided through the walls of each tube 18.

The end plate 28, as shown in FIGURE 3, has the shape of a hollow perforated cone of fused silica. All tubes 18 having equal length, the base of the cone surrounds the openings 30 of the tubes and is affixed thereto in any suitable manner, for example by fusing the edge 32 of the cone to the outer portions of the edges of the openings 30.

It can be seen that the end portions as shown in FIGURES 1 and 3 may be interchanged, i.e. the hollow bundle of FIGURES 3 and 4 can be provided with a cone having larger openings whereas the bundle of tubes shown in FIGURES 1 and 2 may consist of tubes of equal length and may have a conical end plate as illustrated in FIGURE 3 affixed thereto and provided with a plurality of fine openings.

Further repression of sound may be achieved by filling the silica tubes at least partly with a refractory, gas-permeable material 36 (FIGURE 4), as quartz wool or grains or the like, which does not obstruct the passage of the exhaust gases to a noticeable extent.

It will be obvious to those skilled in the art that many modifications may be made within the scope of the present invention without departing from the spirit thereof, and the invention includes all such modifications.

What is claimed is:

1. A high-temperature resistant noise suppressor for jet engines comprising a plurality of substantially parallel fused silica tubes adjacent each other arranged in a ring, an inner space defined within the ring for passage of a main stream of exhaust gas therethrough, a gas-permeable, refractory material arranged in the tubes, and a plurality of bores through the wall of each tube, the bores forming oblique angles with the axes of the tubes.

2. A high-temperature resistant noise suppressor for jet engines comprising a plurality of substantially parallel fused silica tubes adjacent each other arranged in a ring, an inner space defined within the ring for passage of a main stream of exahust gas therethrough, a gas-permeable, refractory material arranged in the tubes, a plurality of bores through the wall of each tube, the bores forming oblique angles with the axes of the tubes, and a conical hollow perforated end member of fused silica affixed to one end of said ring arrangement of tubes to encompass in its open base the ends of the tubes.

References Cited in the file of this patent

UNITED STATES PATENTS

| | | |
|---|---|---|
| 700,785 | Kull | May 27, 1902 |
| 750,011 | Willis et al. | Jan. 19, 1904 |
| 1,595,711 | Cornelier | Aug. 10, 1926 |
| 1,611,353 | Lepinte | Dec. 21, 1926 |
| 1,709,333 | Webb | Apr. 16, 1929 |
| 1,745,492 | Kelch et al. | Feb. 4, 1930 |
| 1,756,711 | Van Voorhees | Apr. 29, 1930 |
| 1,916,908 | Stacey et al. | July 4, 1933 |
| 2,072,961 | Nelson | Mar. 9, 1937 |
| 2,185,584 | Boyce | Jan. 2, 1940 |
| 2,450,327 | Cogan et al. | Sept. 28, 1948 |
| 2,499,018 | Christiano et al. | Feb. 28, 1950 |
| 2,583,366 | Engels | Jan. 22, 1952 |
| 2,633,703 | Tenney et al. | Apr. 7, 1953 |
| 2,874,071 | Kadisch et al. | Feb. 17, 1959 |
| 2,998,860 | Everett | Sept. 5, 1961 |

FOREIGN PATENTS

| | | |
|---|---|---|
| 250,399 | Great Britain | Apr. 15, 1926 |
| 156,689 | Switzerland | Nov. 1, 1932 |